(12) United States Patent
Hansen

(10) Patent No.: US 7,940,751 B2
(45) Date of Patent: May 10, 2011

(54) PERSONAL AREA NETWORK DATA ENCAPSULATION IN WLAN COMMUNICATIONS

(75) Inventor: Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 795 days.

(21) Appl. No.: 11/871,960

(22) Filed: Oct. 12, 2007

(65) Prior Publication Data
US 2008/0175213 A1  Jul. 24, 2008

Related U.S. Application Data

(60) Provisional application No. 60/881,999, filed on Jan. 23, 2007.

(51) Int. Cl.
*H04L 12/66* (2006.01)
(52) U.S. Cl. ........................................ 370/354
(58) Field of Classification Search .................. 370/354, 370/342
See application file for complete search history.

(56) References Cited

U.S. PATENT DOCUMENTS

| | | | | |
|---|---|---|---|---|
| 7,720,030 B2* | 5/2010 | Solomon et al. | | 370/329 |
| 7,756,101 B2* | 7/2010 | Tervonen et al. | | 370/348 |
| 7,756,211 B2* | 7/2010 | Kim et al. | | 375/267 |
| 2003/0081582 A1* | 5/2003 | Jain et al. | | 370/338 |

\* cited by examiner

*Primary Examiner* — Ricky Ngo
*Assistant Examiner* — Chandrahas Patel
(74) *Attorney, Agent, or Firm* — Garlick Harrison & Markison

(57) ABSTRACT

An integrated circuit radio transceiver and associated method comprises a multi-mode device operable to support personal area network communications as well as traditional wireless local area network communications. In one embodiment, IEEE 802.11 protocol IBSS communications are used to transport Bluetooth communication data packets. In another embodiment, a direct link comprising direct packet transfers without beaconing is performed between the multi-mode device and another multi-mode device. Thus, the multi-mode device is operable to establish traditional BSS communications with an Access Point in addition to establishing peer-to-peer communications with another multi-mode device to transport the Bluetooth communications over the 802.11 IBSS communication link or over an IEEE 802.11 direct communication link.

12 Claims, 18 Drawing Sheets

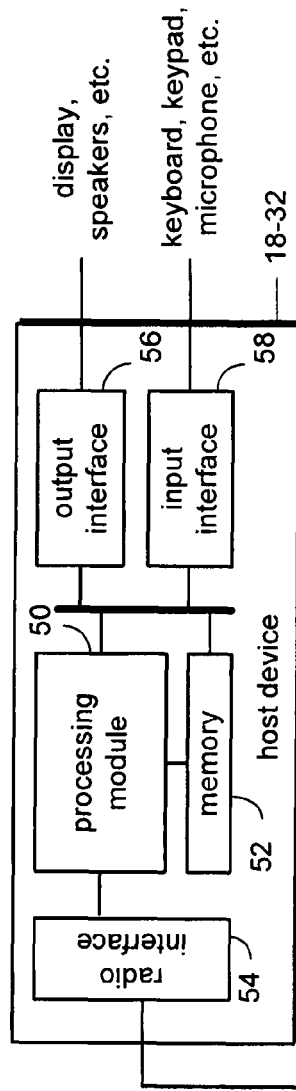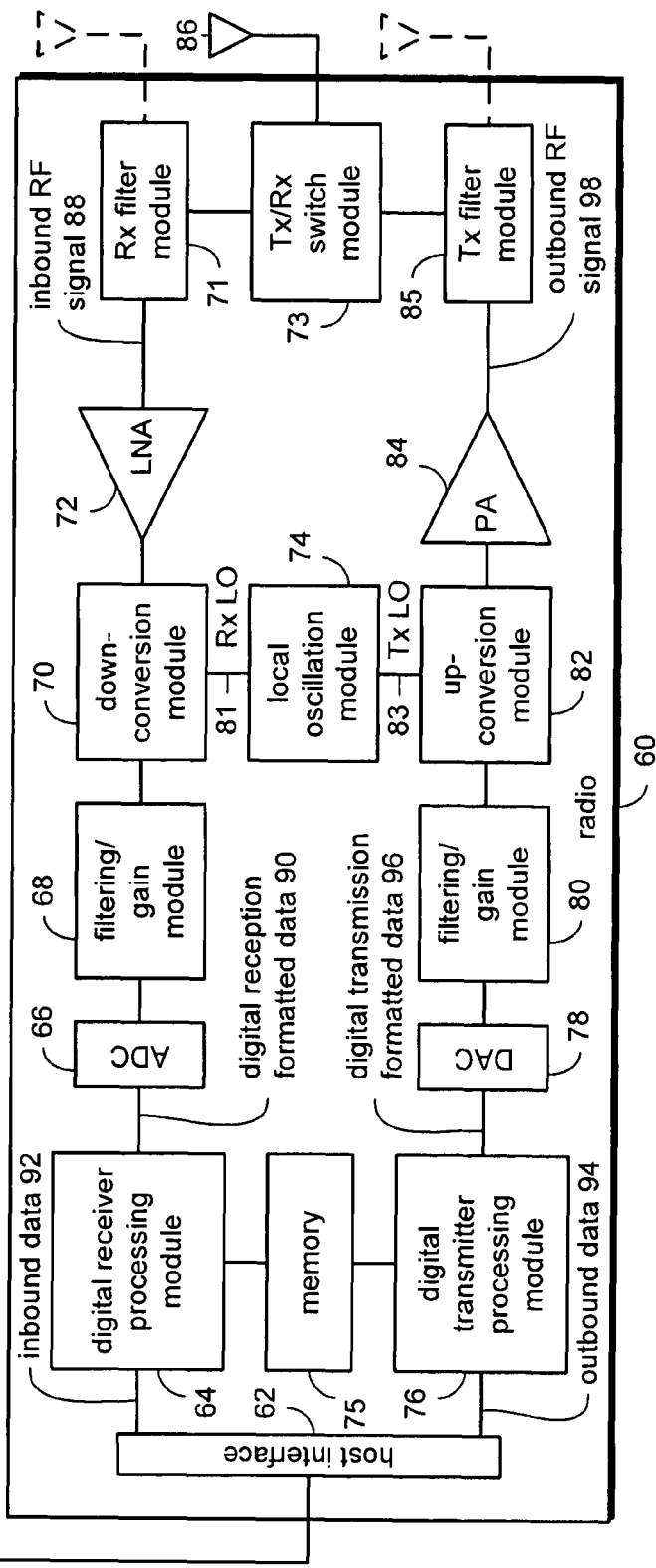
FIG. 2
radio transceiver

L2CAP Packet

| Octets: 2 | 2 | 0-65535 |
|---|---|---|
| Length | Channel ID | Payload |

MSDU Data

| Octets: 1 | 1 | 2 | 0-2302 |
|---|---|---|---|
| Packet ID | Fragment Number | Channel ID (first fragment only) | Payload Fragment |

FIG. 15

Bluetooth Packet Encapsulation

PERSONAL AREA NETWORK DATA ENCAPSULATION IN WLAN COMMUNICATIONS

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

U.S. Provisional Application Ser. No. 60/881,999, entitled "PERSONAL AREA NETWORK DATA ENCAPSULATION IN WLAN COMMUNICATIONS", filed Jan. 23, 2007.

BACKGROUND

1. Technical Field

The present invention relates to wireless communications and, more particularly, to circuitry transmitting communications through multi-mode devices.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

Personal area networks provide advantageous operations and are commonly used for very short distance communications. On occasion, however, there is a need to transport communication data from such personal area networks over a distance that is not readily supported by the personal area network. Moreover, a need exists for such communications to be secure.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 2 is a schematic block diagram illustrating a wireless communication host device and an associated radio;

FIG. 15 is a flow chart illustrating a method for communication over a first protocol communication link and for transmitting second protocol communications over the first protocol communication link according to one embodiment of the invention;

DETAILED DESCRIPTION OF THE DRAWINGS

Figure 1:
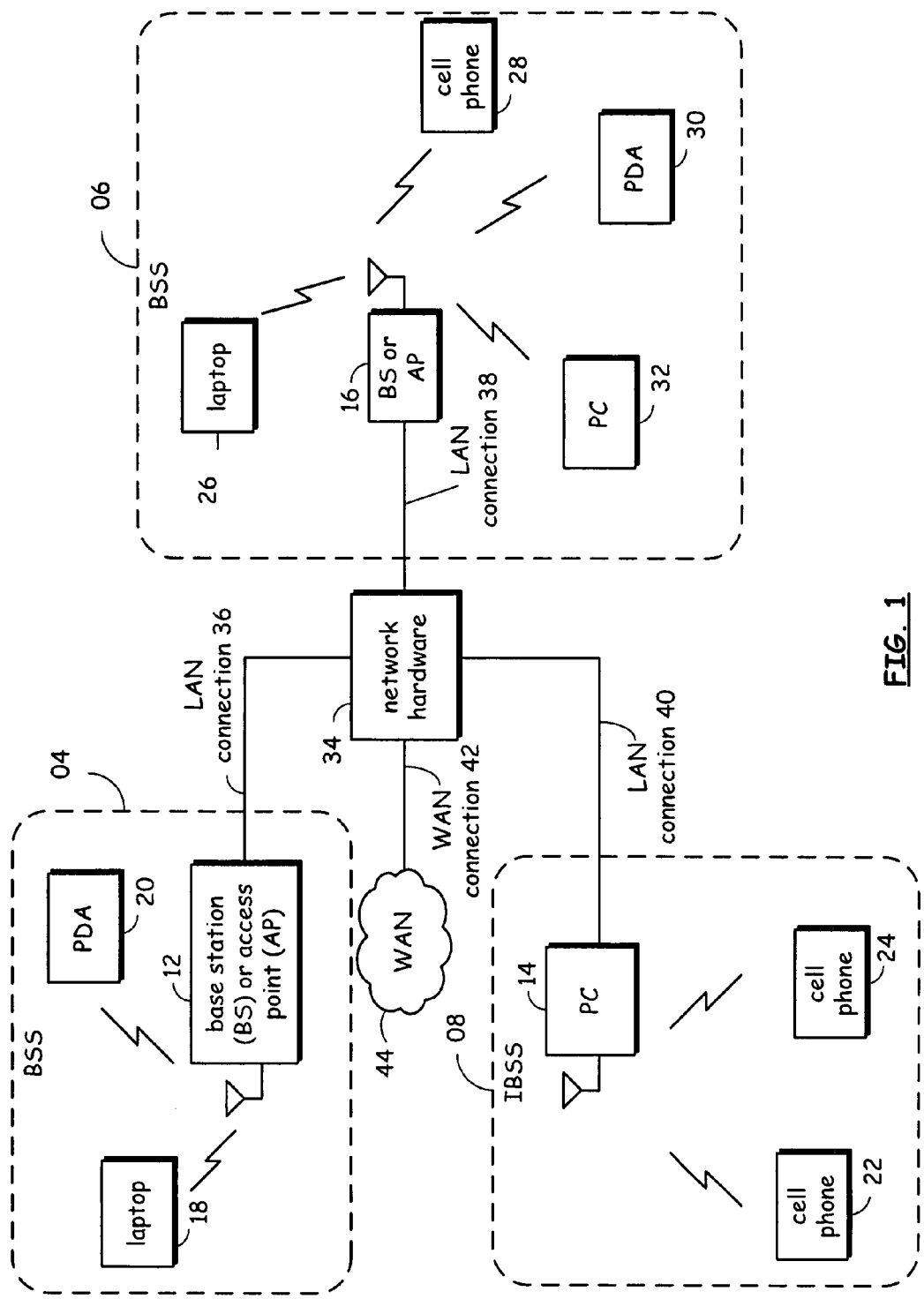
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12 and 16, a plurality of wireless communication devices 18-32 and a network hardware component 34. The wireless communication devices 18-32 may be laptop computers 18 and 26, personal digital assistants 20 and 30, personal computers 14 and 32 and/or cellular telephones 22, 24 and 28. The details of the wireless communication devices will be described in greater detail with reference to the Figures that follow.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
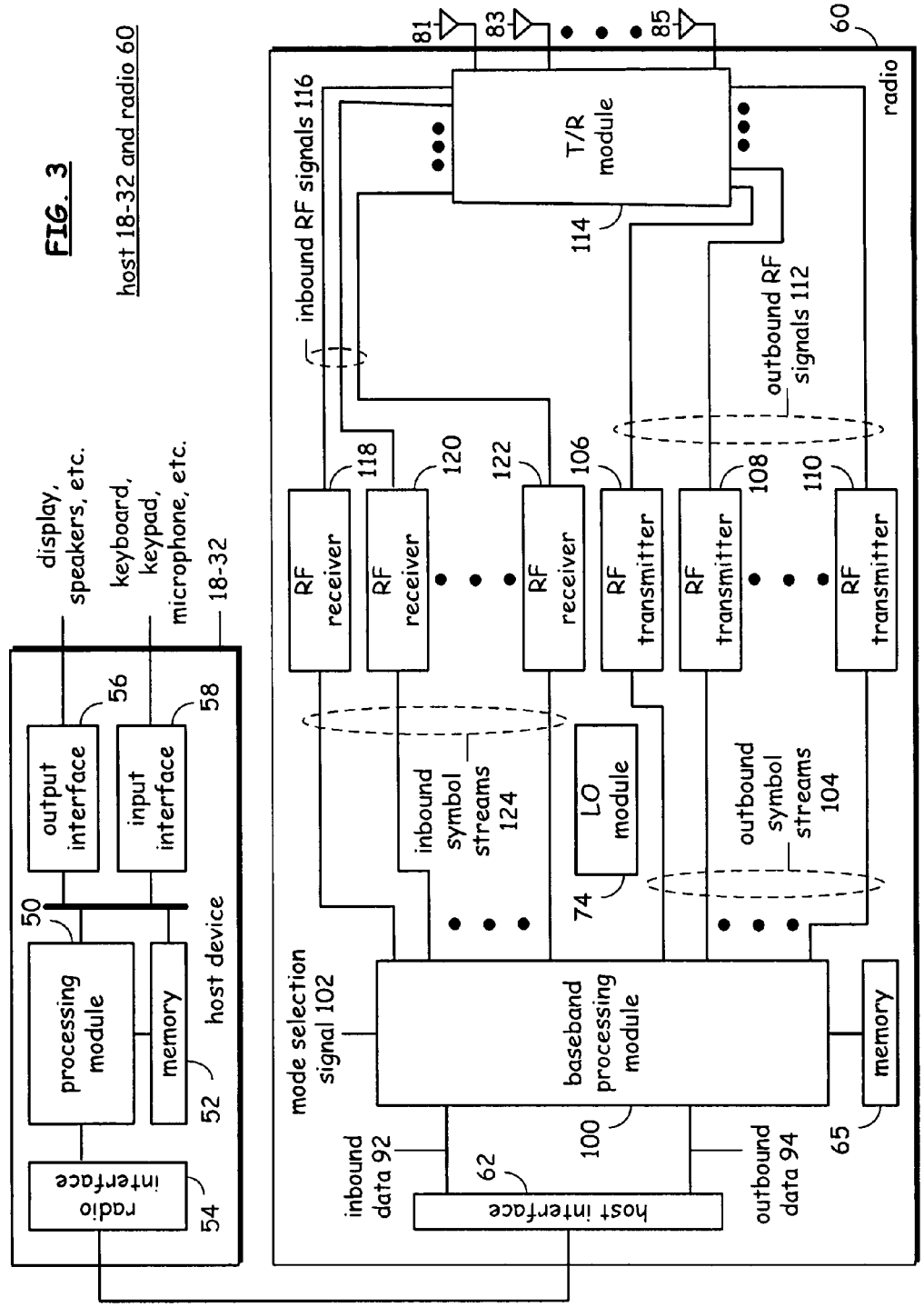
FIG. 3 is a schematic block diagram illustrating a wireless communication device that includes a host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
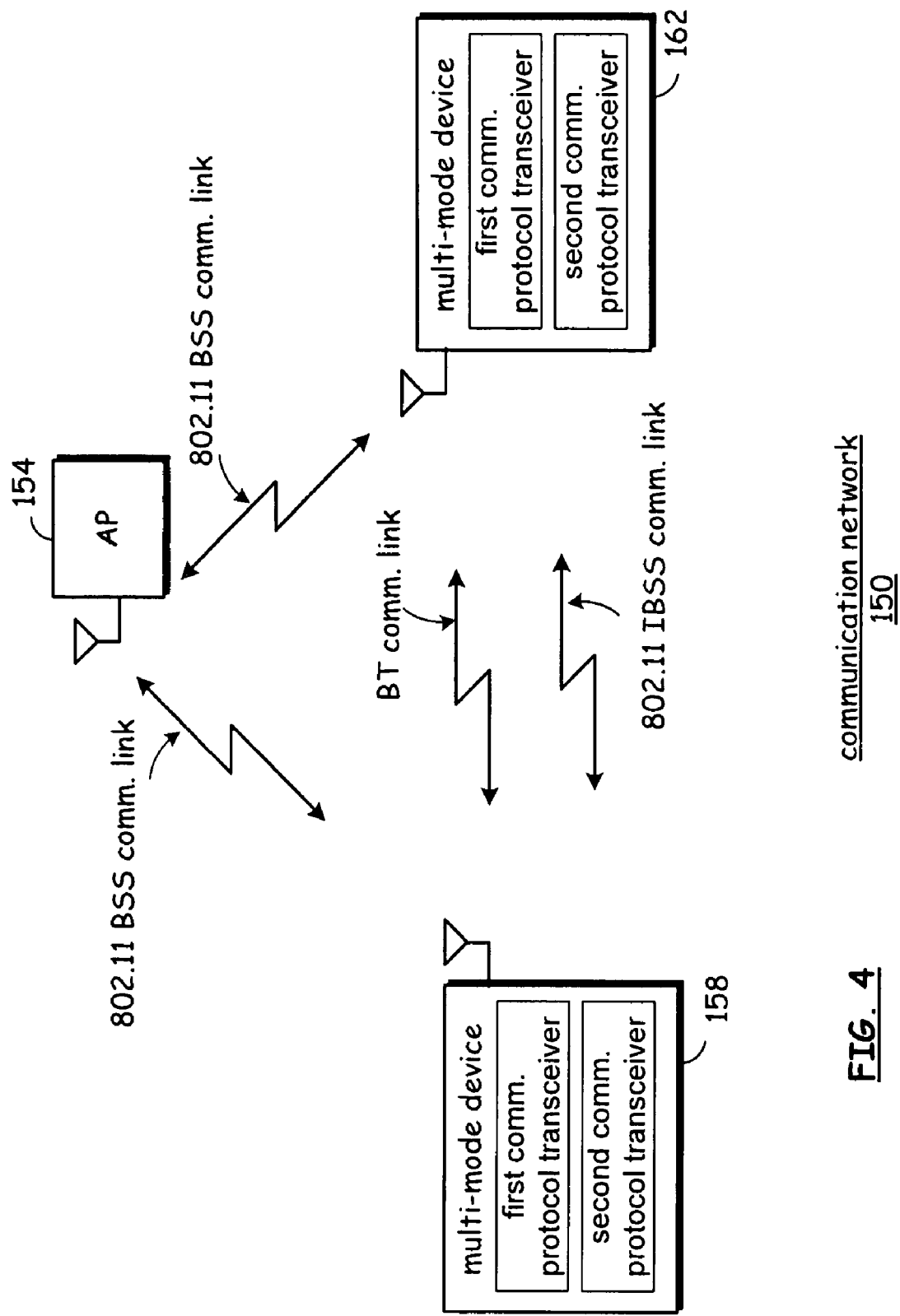
FIGS. 4 and 5 illustrate communication networks with communication devices according to various embodiments of the invention.

FIG. 4 is a functional block diagram of a communication network according to one embodiment of the present invention. A communication network 150 includes an access point 154 operable to generate beacons to control wireless local area network communications with compatible communication devices in a hub-and-spoke configuration of a first communication network that operates according to a first communication network protocol. In the described embodiment, the communications controlled by access point 150 are BSS communications as defined by IEEE 802.11 communications protocols. Network 150 further includes a first multi-mode communication device 158 operable to support communications with the access point 154 according to the first communication network protocol and further operable to concurrently support peer-to-peer communications with other multi-mode communication devices such as device 162.

Second multi-mode communication device 162 is operable to support communications with the access point 154 according to the first communication network protocol and is further operable to concurrently support peer-to-peer communications with other multi-mode communication devices such as device 162. The peer-to-peer communications may be IEEE 802.11 IBSS communications as well as Bluetooth Master/Slave communications.

The first and second multi-mode communication devices 158 and 162 are thus operable to communicate in a peer-to-peer configuration with each other while also supporting communications with the access point. More specifically, the first and second multi-mode communication devices 158 and 162 are operable to communicate over the peer-to-peer network using the first communication network protocol (the IBSS communications) and are further operable to carry communications of a second communication network communication (Bluetooth) using the peer-to-peer configuration using the first communication network protocol.

Figure 5:
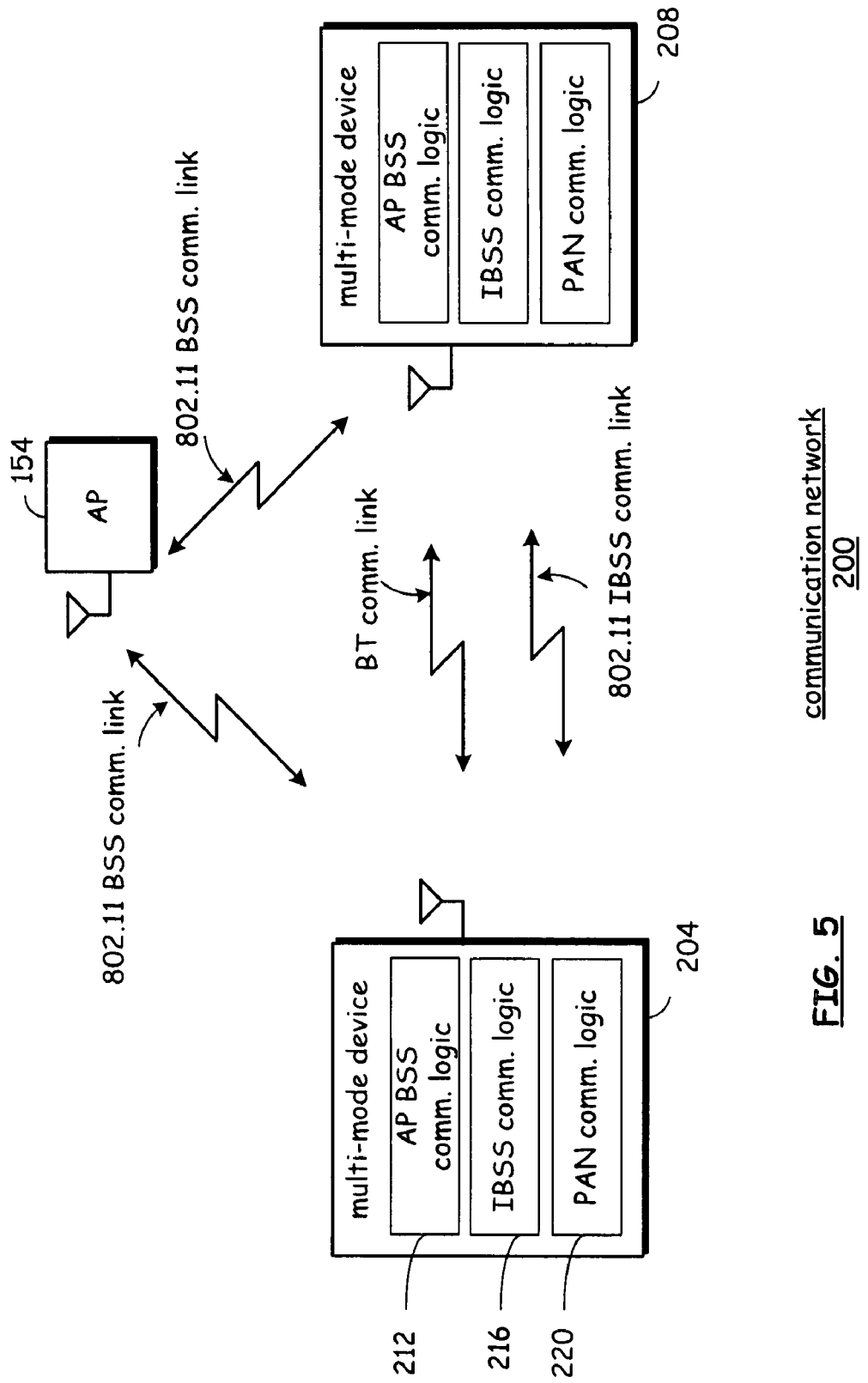

FIG. 5 is a functional block diagram of a communication network according to one embodiment of the invention. A multi-mode communication device 204 is operable to communication with access point 154 and with device 208. Device 204 includes a first communication logic 212 operable to support communications with an access point according to a first communication network protocol (802.11 in the described embodiment). Device 204 further includes a second communication logic 216 operable to support peer-to-peer communications with other multi-mode communication devices according to the first communication network protocol at the same time the first communication logic operably supports communications with the access point 154. First and second multi-mode communication devices 204 and 208 are further operable to communicate in a peer-to-peer configuration with each other while also supporting communications with the access point.

The multi-mode communication device 204 further included a third communication logic 220 operable to support peer-to-peer communications with other multi-mode communication devices according to a second communication protocol (Bluetooth in the described embodiment) while at least one of the first and second communication logics are operable to support their respective communications.

The second communication protocol, namely Bluetooth, is a known personal area network protocol. Whether the second protocol is Bluetooth or another personal area network communication protocol, the protocol is a peer-to-peer communication protocol. For Bluetooth protocol communications, the first and second communication logics are operable to support master-slave communications according to the second communication protocol by transporting communication signals of the second communication protocol.

Figure 6:
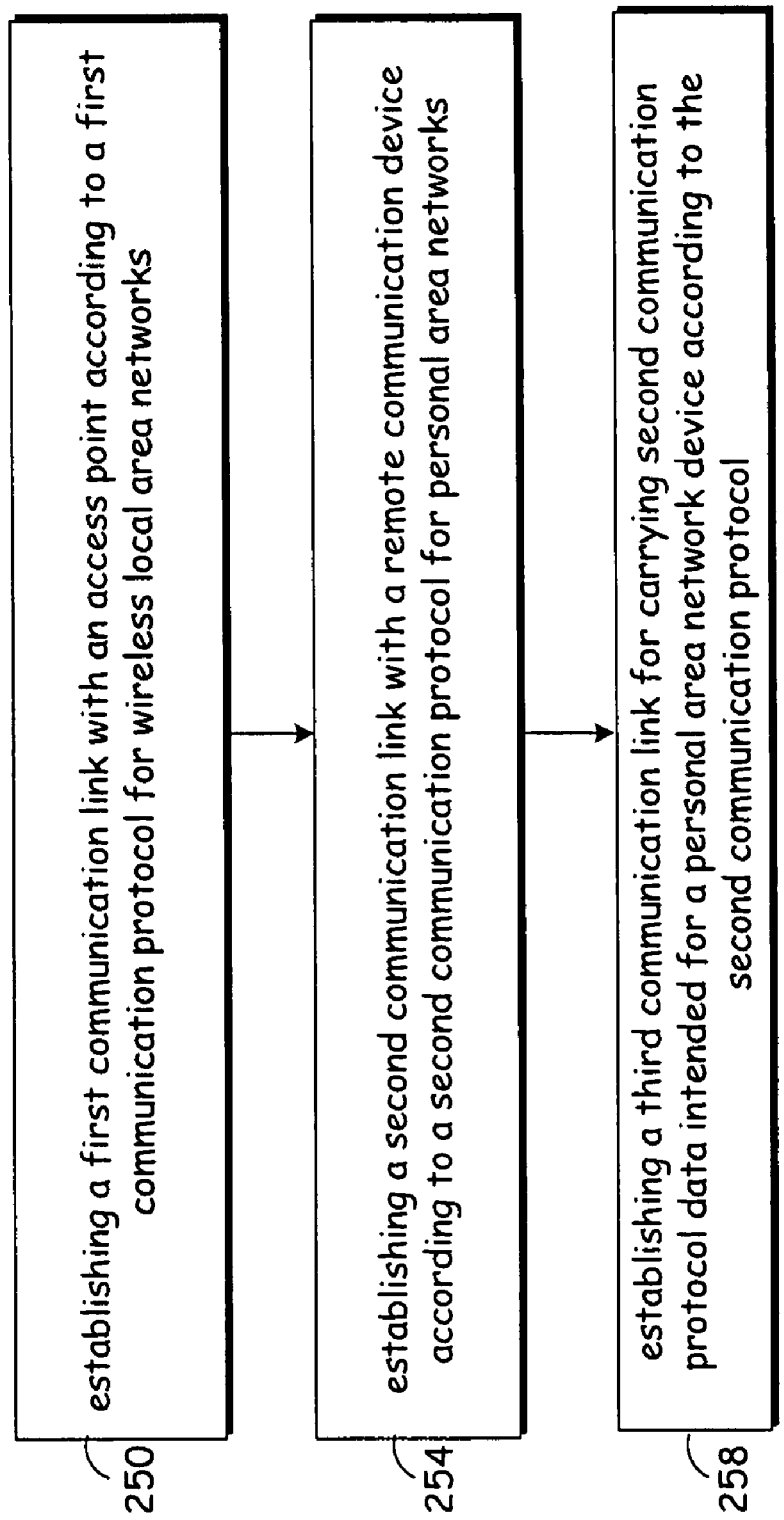
FIG. 6 is a flow chart illustrating a method supporting multi-mode communications in a wireless multi-mode communication device.

FIG. 6 is a flow chart illustrating a method supporting multi-mode communications in a wireless multi-mode communication device. Specifically, the method includes establishing a first communication link with an access point according to a first communication protocol for wireless local area networks (step 250). The method further includes establishing a second communication link with a remote communication device wherein the second communication link is a peer-to-peer communication link according to the first communication protocol (step 254). Finally, the method includes establishing a third communication link for carrying second communication protocol data intended for a personal area network device according to the second communication protocol (step 258). The third communication link is a peer-to-peer communication according to the second communication protocol. The first communication link is a BSS communication link as defined by 802.11 standard communication protocol standards. The second communication link is an IBSS communication link as defined by 802.11 standard communication protocol standards. The communication device performing the method of FIG. 6 is thus operable to carry communications from the third communication link according to the second communication protocol on the second communication link according to the first communication protocol.

Figure 7:
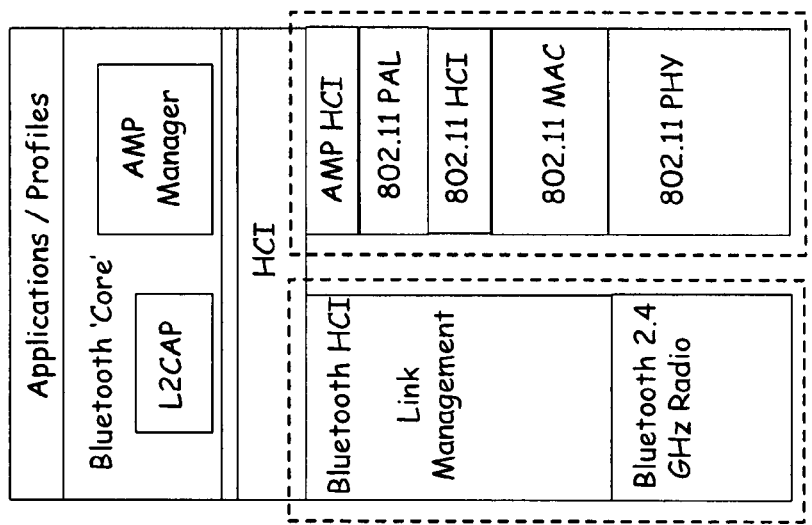
FIG. 7 illustrates various OSI type stack layers of a multi-mode radio transceiver operable to carry Bluetooth communication under 802.11 protocols.

FIG. 7 illustrates various OSI type stack layers of a multi-mode radio transceiver operable to carry Bluetooth communication under 802.11 protocols.

Figure 8:
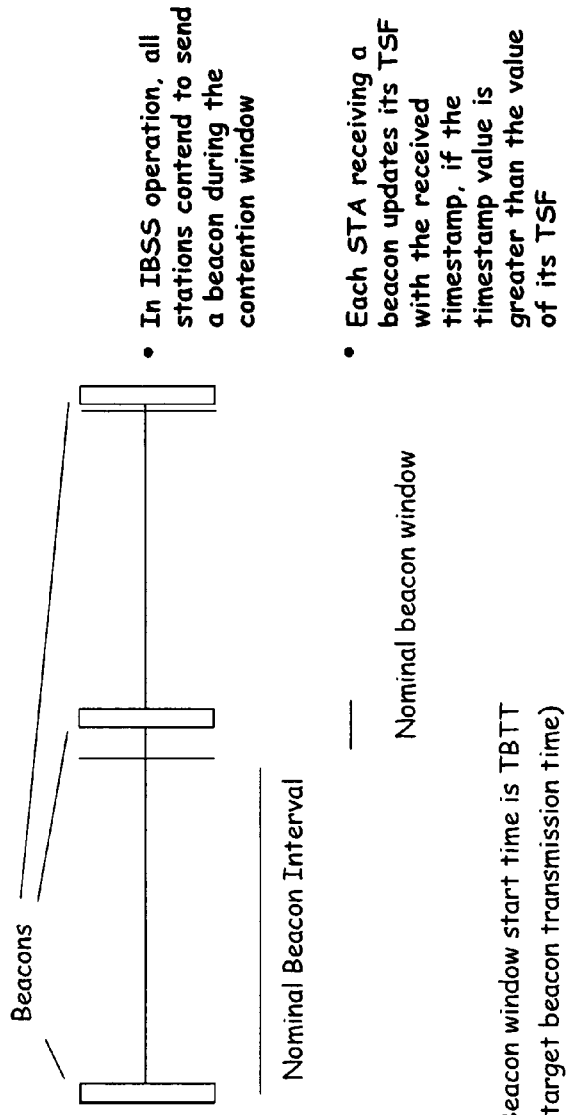
FIGS. 8 and 9 illustrate timing of a setting of IBSS beacons according to one embodiment of the invention.
Figure 9:
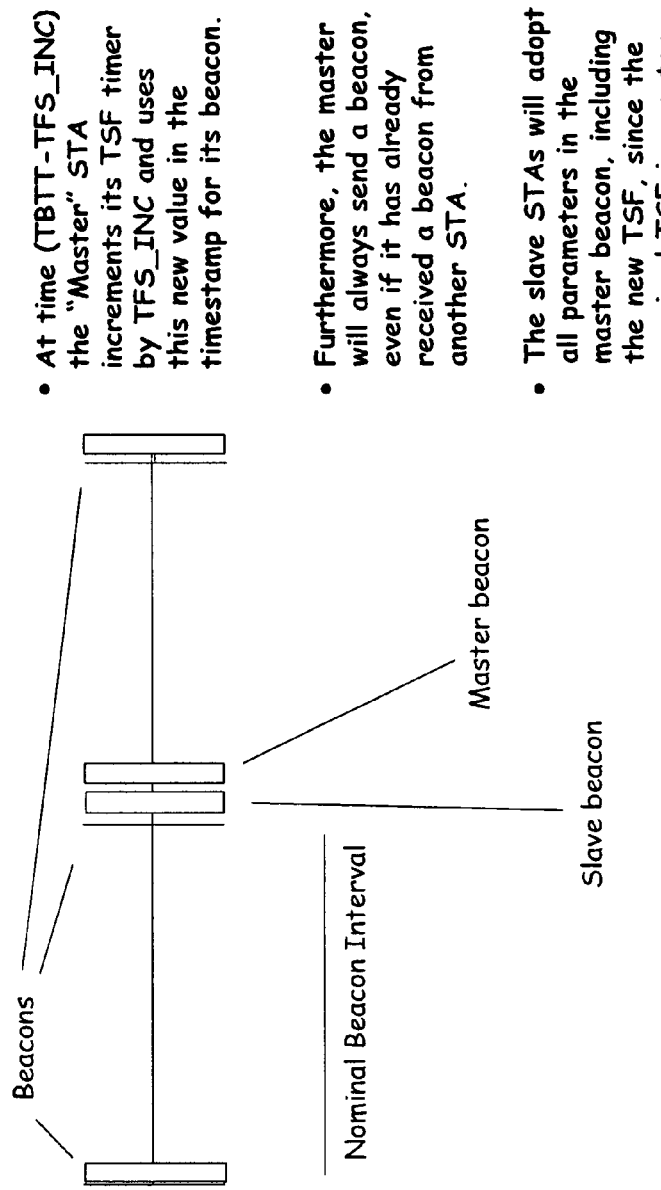

FIGS. 8 and 9 jointly illustrate timing of the setting of IBSS beacons according to one embodiment of the invention. Specifically, a terminal that determines to operate as a "master" of a peer-to-peer IBSS communication link, advances its TSF timer to prevent transmission settings from being reset by other multi-mode devices.

The first and second multi-mode communication devices are thus operable to communicate in a peer-to-peer configuration using the first communication network protocol including operating according to protocol for a TSF Timer while also communicating with the access point using the first communication network protocol. Specifically, each of the first and second multi-mode communication devices is operable to determine that it should act as a master of the peer-to-peer configuration and, based upon determining to act as a master, to advance a value of its TSF Timer. The first and second multi-mode communication devices are further operable to send a beacon on a periodic basis based upon the advanced TSF timer value and to compare a time stamp value in a received beacon and to compare the received time stamp value to its TSF timer value. The first and second multi-mode communication devices determine to not send out a beacon based upon the comparison of the time stamp value in a received beacon and to its TSF timer value if the time stamp value is greater than its TSF timer value. Alternatively, the first and second multi-mode communication devices are operable to determine to send out a beacon based upon the comparison of the time stamp value in a received beacon and to its TSF timer value if the time stamp value is less than its TSF timer value.

Figure 10:
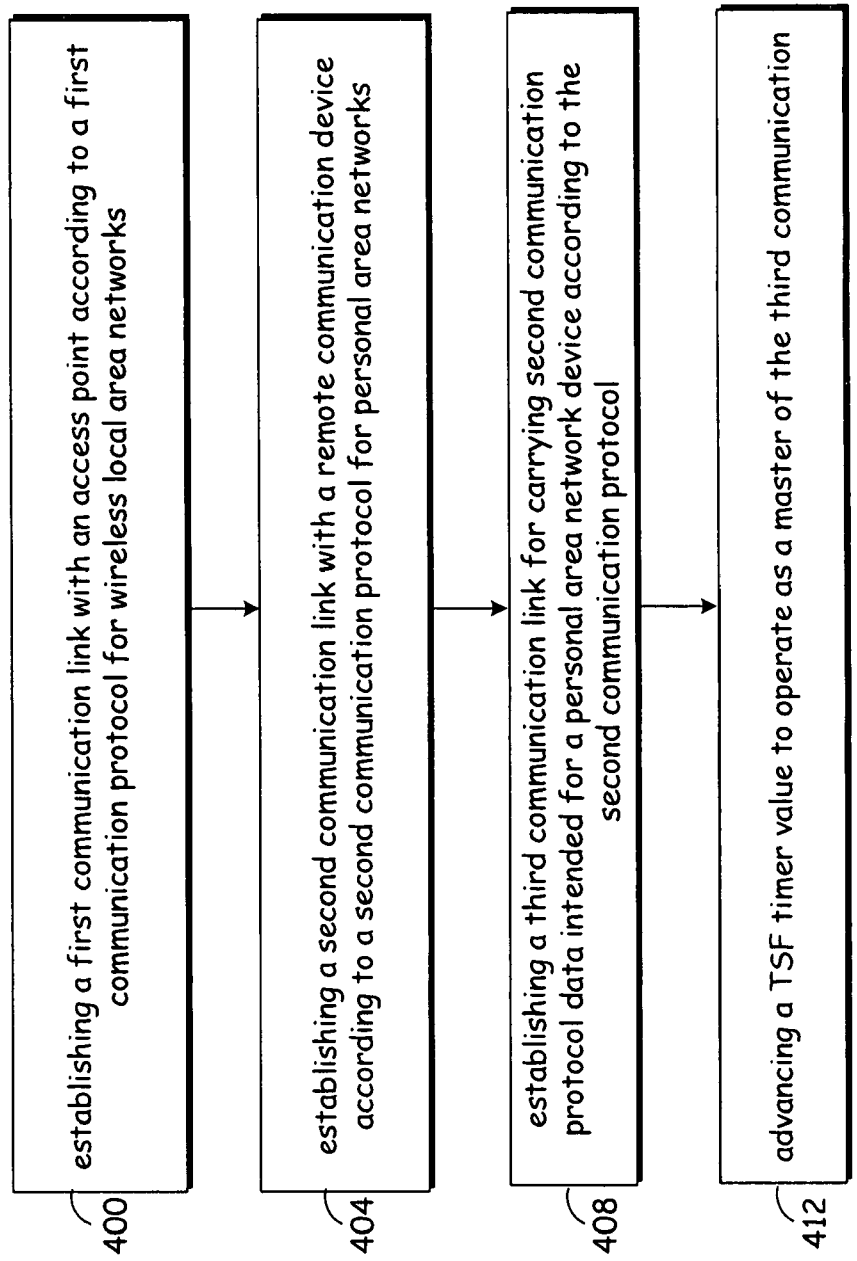
FIG. 10 illustrates a method for multi-mode communications in a wireless local area network communication device.

FIG. 10 is a method for multi-mode communications in a wireless local area network communication device. The method comprises establishing a first communication link with an access point according to a first communication protocol for wireless local area networks (step 400), establishing a second communication link with a remote communication device according to a second communication protocol for personal area networks (step 404), establishing a third communication link for carrying second communication protocol data intended for a personal area network device according to the first communication protocol (step 408) and advancing a TSF timer value to operate as a master of the third communication (step 412).

The third communication is a peer-to-peer communication according to the first communication protocol. In one embodiment, the third communication is an IBSS communication link as defined by 802.11 standard communication protocol standards.

Figure 11:
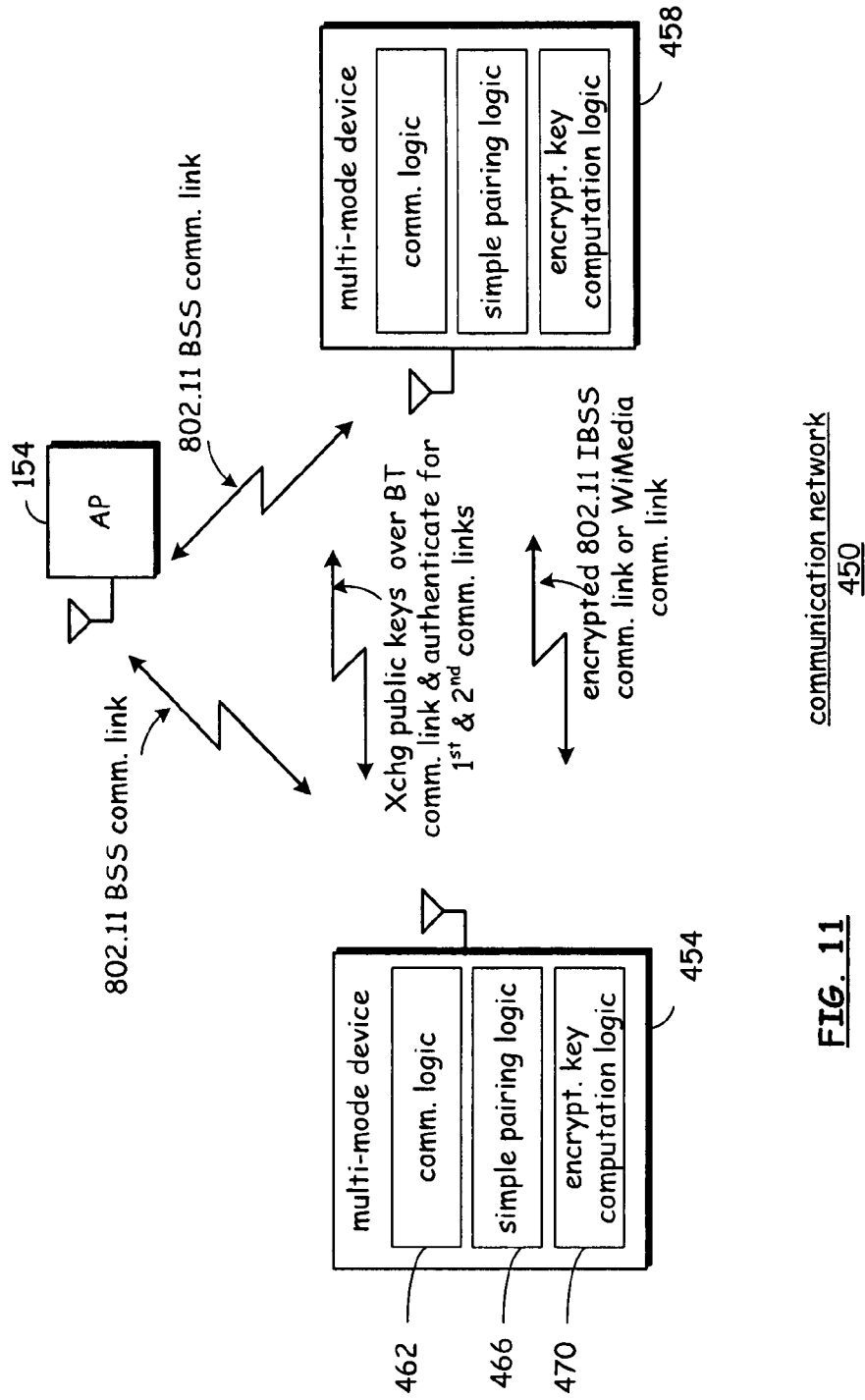
FIG. 11 is a functional block diagram that illustrates a method and apparatus according to one embodiment of the invention.

One aspect of establishing an IBSS communication link according to IEEE 802.11 is to secure the communication link that will call the personal area communication data. FIG. 11 is a functional block diagram that illustrates a method and apparatus according to one embodiment of the invention for establishing a secure data call. A communication network 450 includes multi-mode device 454 and 458 that are operable to provide secure communications according to the embodiments of the invention. Each device has a communication logic 462 that supports the modes of communication described herein. A logic 466 is operable to engage in a simple pairing procedure to establish a key. A logic 470 is operable to encrypt the communications using the key of logic 466.

More specifically, multi-mode devices 454 and 458 are operable to establish a Bluetooth (more generally, personal area network (PAN) communication link) to exchange public keys according to defined simple pairing logic. Thereafter, multi-mode devices 454 and 458 are operable to generate secure keys for decoding subsequent communications that are to be used over a second or different protocol communication link that provides greater bandwidth, range or data rates in relation to the Bluetooth or PAN communication link. For example, in one embodiment, a Bluetooth communication link is used to exchange public keys as a part of a simple pairing procedure to determine secure encryption keys that may then be used to establish a secure communication link. Thereafter, the subsequent communication link, which may be WiMedia or 802.11, for example, may be used with the secure encryption keys that were determined using the Bluetooth public key exchange procedures according to Bluetooth protocols. Thus, simple pairing logics 466 support the steps of exchanging the public keys according to Bluetooth simple pairing protocols while encryption key computation logics 470 support determining the secure encryption keys based up the exchanged public keys. Thereafter, communication logics 462 support utilizing the secure encryption keys for secure communications according to, for example, 802.11 and WiMedia communication protocols.

Figure 12:
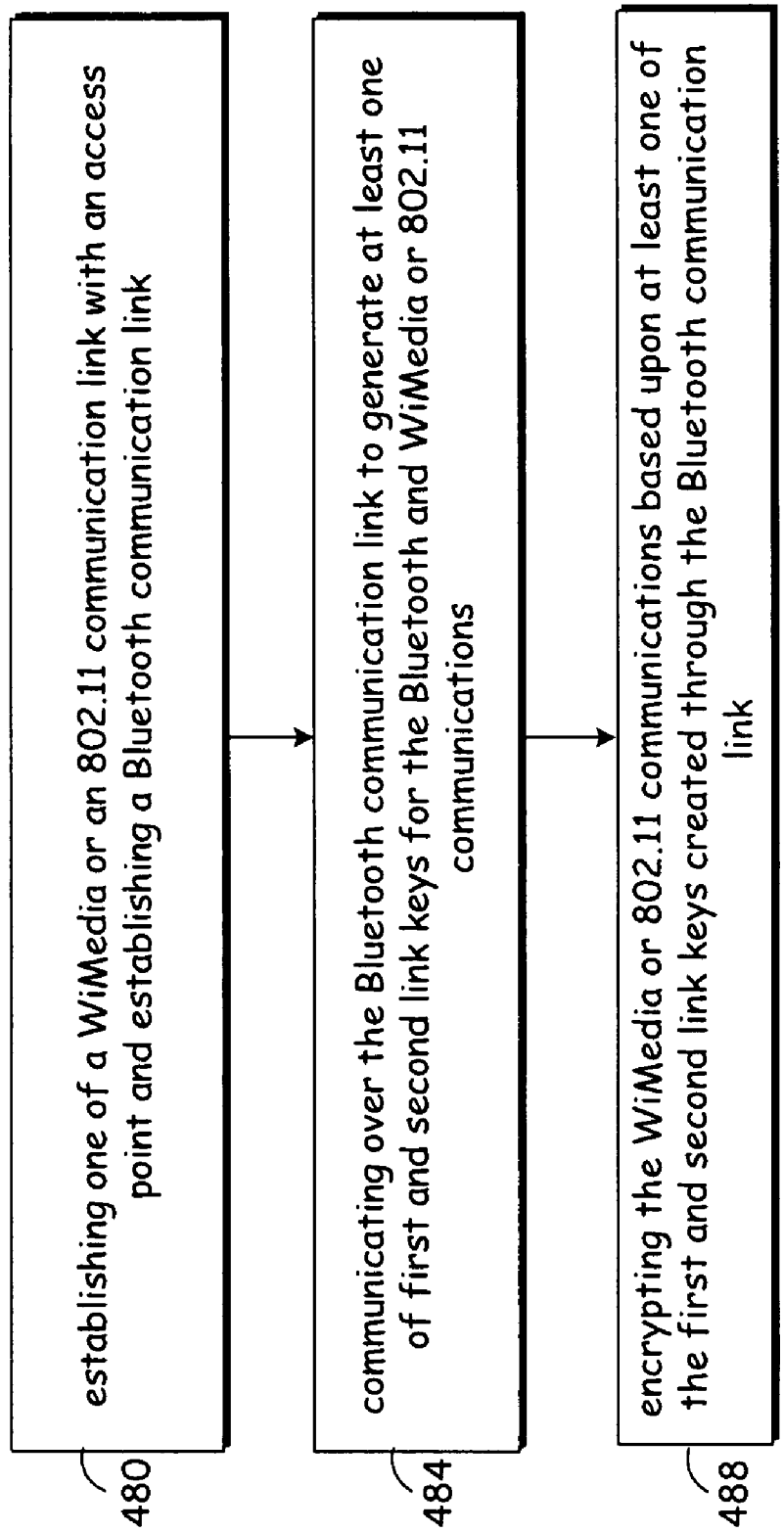
FIG. 12 illustrates a method for encrypting a first protocol communication link (802.11 or WiMedia in two of the embodiments of the invention) for peer-to-peer communications.

FIG. 12 illustrates a method according to one embodiment of the invention. Initially, the method includes establishing an 802.11 communication link with an access point and establishing a Bluetooth communication link (step 480). Thereafter, the method includes communicating over the Bluetooth communication link to generate at least one of first and second link keys for the Bluetooth and 802.11 communications (step 484). Finally, the method includes encrypting the 802.11 communications based upon at least one of the first and second link keys created through the Bluetooth communication link (step 488). In one embodiment of the invention, the first and second keys are formed using a four digit code. More particularly, the four digit code comprises a MAC address in one embodiment. In another embodiment, the MAC address plus additional characters are used to generate unique first and second link keys.

Figure 13:
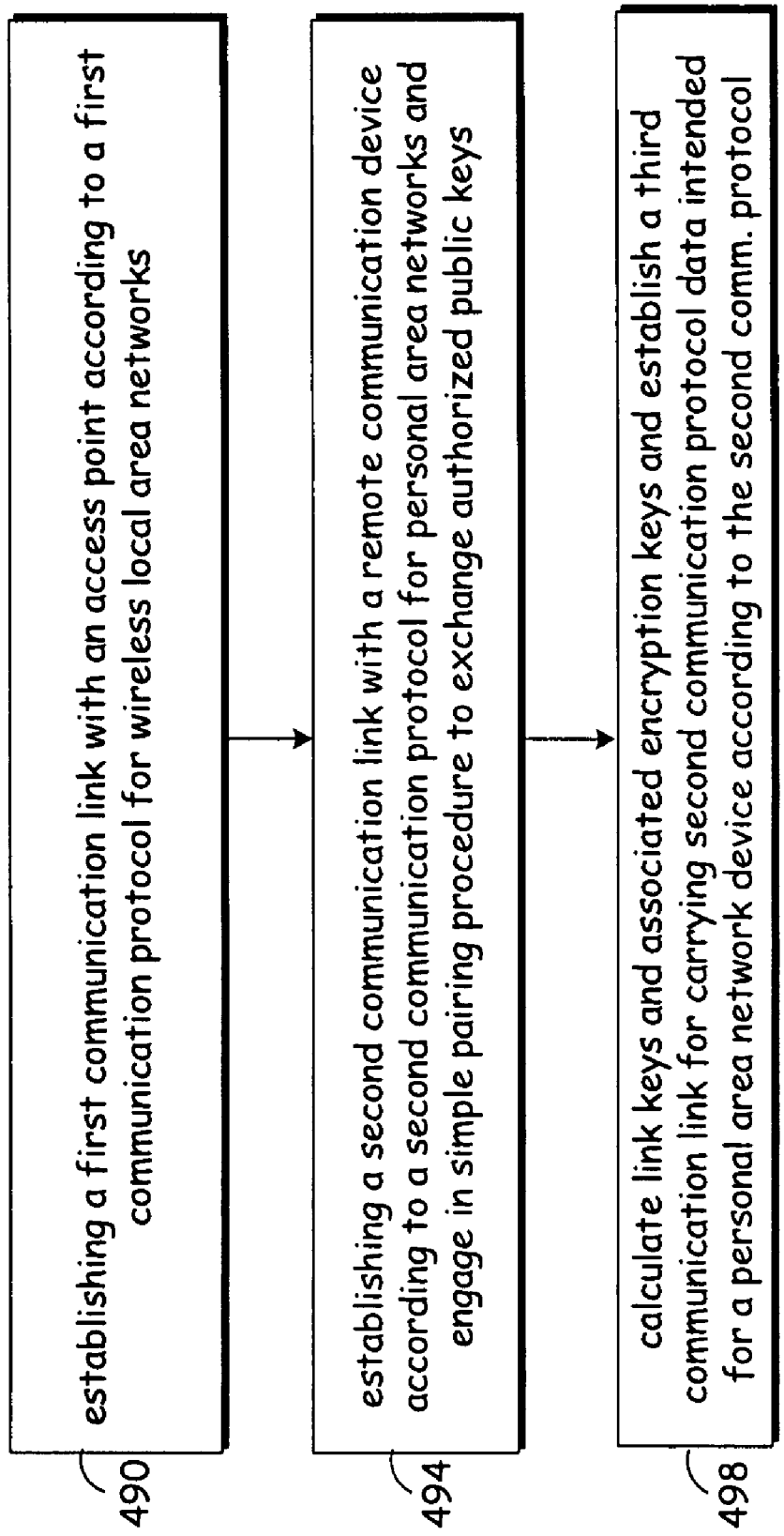
FIGS. 13 and 14 illustrate arrangements of the first and second protocol packets, data, and frames according to one embodiment of the invention.

FIG. 13 illustrates an alternate embodiment of the invention. A method for encrypting a first protocol communication link (802.11 or WiMedia in two of the embodiments of the invention) for peer-to-peer communications is shown. Initially, the method includes establishing a first communication link with an access point according to a first communication protocol for wireless local area networks or other device to device communication protocols (step 490). Thereafter, the method includes establishing a second communication link with a remote communication device according to a second communication protocol for personal area networks and engaging in simple pairing procedure to exchange and auth. public keys (step 494). In the described embodiment, a Bluetooth simple pairing procedure is utilized to facilitate an exchange of encryption keys so support a subsequent determination of a secure encryption key. It should be understood, however, that any method for exchanging information in support of the development of encryption keys for use in the first communication link using a second communication link (especially a secure second communication link) may be utilized. The next step includes calculating one or more link keys and one or more associated encryption keys and establish a third communication link for carrying second communication protocol data intended for a personal area network device according to the second comm. Protocol (step 498). The third communication link may be the same as or different as the first communication link. For example, the first and third communication links may be the same or different 802.11 based communication links (e.g., either one or both of BSS and IBSS communication links).

Alternatively, the first and third communication links may both be WiMedia communication links. In yet another embodiment, the first communication link may be an 802.11 communication link, the second may be any type of PAN communication link including Bluetooth, and the third communication link can be WiMedia. In general, the PAN communication link is utilized for the determination of one or more secure encryption keys for the third communication link.

During a public key exchange process, one of a plurality of key determination strategies may be utilized. In one embodiment, the public keys are exchange for the determination of a single encryption key that is subsequently utilized in all of the communication links. In an alternate embodiment, a plurality of secure encryption keys are developed wherein one key is developed for the second communication link (the PAN communication link) and one key is developed for the subsequent third communication link (e.g., 802.11 or WiMedia).

Figure 14:
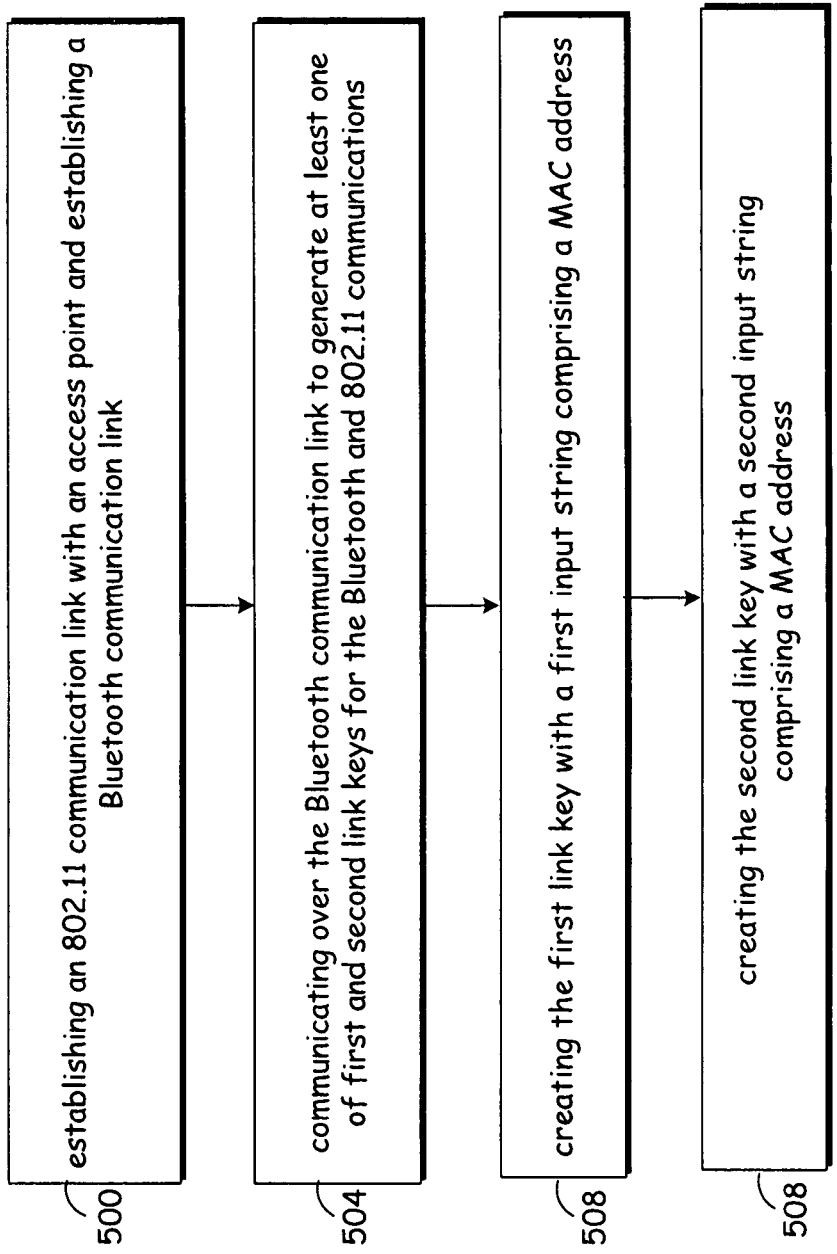

FIG. 14 is a flow chart that illustrates other aspects of the embodiments of the invention. For example, the method of the embodiment of FIG. 14 comprises initially establishing an 802.11 communication link with an access point and establishing a Bluetooth communication link (step 500) for engaging in second communication protocol pairing exchange process (Bluetooth in one embodiment) to generate a first link key for second protocol communications (Bluetooth in one embodiment) over an encrypted link according to the second communication protocol. The method further includes communicating over the Bluetooth communication link to generate at least one of first and second link keys for the Bluetooth and 802.11 communications (step 504) or, more generally, engaging in second communication protocol pairing exchange over an encrypted link according to the second communication protocol to generate a second link key for first protocol communications and subsequently creating an encrypted first protocol communications based on the second link key.

Thereafter, the method includes creating the first link key with a first input string comprising a MAC address (step 508). Thereafter, the second link key is generated, in one embodiment, using the same algorithm as the first link key with the same or with a different input. In the described embodiment, a specified input is used to generate the first and second link keys which comprises four character string. The specified input that is used for generating the first link key is different (different numerical value) than the specified input used for generating the second link key. The four character string is one that is extracted from information in a second protocol communication. Thus, the method includes, in one embodiment, creating the second link key with a second input string comprising a MAC address (step 508).

Alternatively, the specified input is combination of a medium access control (MAC) address and a four character string wherein the values of the MAC address and the four character string that are used for generating the first link key are different from the values used for generating the second link key.

In yet another alternate embodiment, the second link key is generated using the same algorithm as the first link key with the same input. Further, the keys that are generated for the first protocol and the second protocol are of different lengths. The first key is a 128 bit key while the second key is a 256 bit key. In one embodiment, the same algorithm is used to generate the first and second keys with different inputs. Thereafter, the 128 most significant bits of first generated key are used as the first key.

One aspect of the embodiments of the present invention include engaging in second protocol pairing exchange to generate a first link key for second protocol communications includes generating an encrypted communication link using a public key of receiver wherein receiver decrypts using its own private key.

Generally, an embodiment of the invention includes a method for encrypting a first protocol communication link by engaging in second communication protocol pairing exchange process over an encrypted link according to the second communication protocol to generate a first link key for the first protocol communications and a second link key for second protocol communications (Bluetooth in one embodiment) and creating encrypted first protocol communications (802.11 IBSS or WiMedia, for example) based on the second link key. In the described embodiment, the first protocol is a protocol communication wherein the encryption is provided for a plurality of communication channels.

The embodiments of the invention also include an apparatus for encrypting a first protocol communication link and for transmitting second protocol communications over the first protocol communication link. The apparatus includes circuitry for engaging in second communication protocol pairing exchange process over an encrypted link according to the second communication protocol to generate a link key for second protocol communications (Bluetooth) and link key for first protocol communications (802.11 or WiMedia). The apparatus further includes circuitry for creating encrypted first protocol communications (802.11 IBSS or WiMedia) based on the second link key. The encryption, in one embodiment, is provided for a plurality of communication channels transmitted according to I.E.E.E. 802.11(n) communication protocol standards.

The apparatus thus supports the at least one of I.E.E.E. I.B.S.S. protocol communications (802.11 based communications) and WiMedia and Bluetooth communications. More specifically, the apparatus supports using a Bluetooth simple pairing exchange to generate link keys for Bluetooth communications as well as link keys for the first protocol communications regardless of whether the first protocol is an 802.11 communication or WiMedia communication. Thus, the circuitry and system of FIG. 11 may be utilized to perform all of the above described embodiments for utilizing one communication link to generate secure encryption keys for a second communication link. As such, the method and hardware support the generation of a communication link whose security is based at least in part upon communications of a different or separate communication link.

One aspect of the embodiments of the present invention is that the different protocol communications generate packets of different sizes. Thus, a packet of a first size is required to be transmitted according to a protocol that defines a different packet size. Moreover, the different protocols further have different packet format and header requirements. An apparatus is thus provided according to one embodiment of the invention for encapsulating second protocol data packets for transmissions over a first protocol communication link. The apparatus includes circuitry operable to break a second communication protocol data packet into a plurality of fragments.

Figure 16:
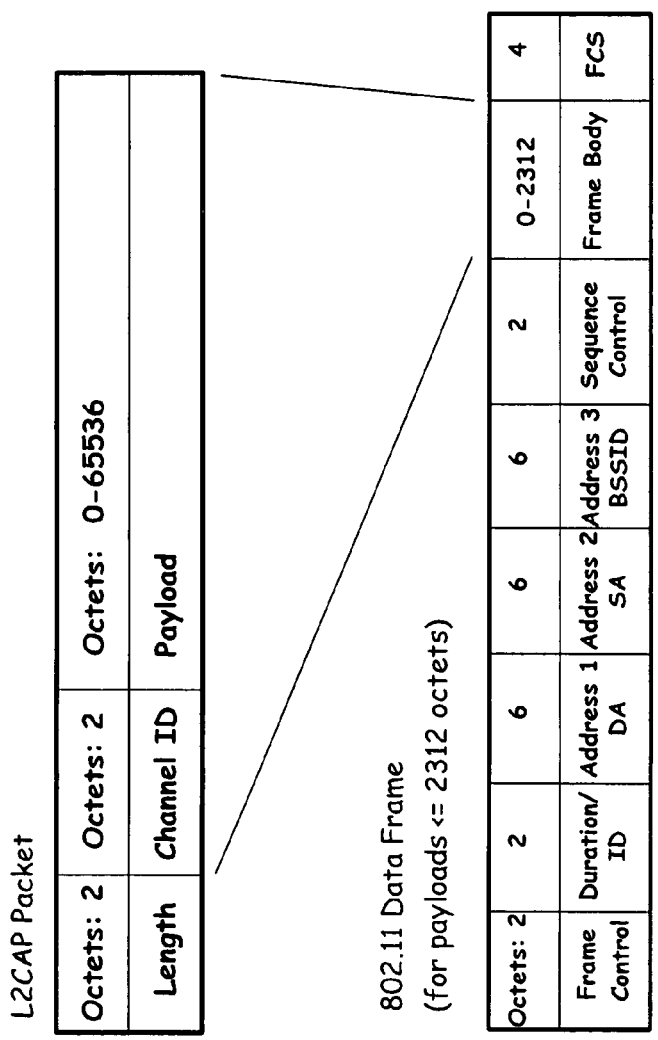
FIG. 16 is a network diagram illustrating operation according to one embodiment of the invention.

FIGS. 15 and 16 illustrate arrangements of the first and second protocol packets, data, and frames according to one embodiment of the invention. Specifically, this includes breaking a much larger Bluetooth packet into a plurality of fragments for encapsulation and transmission in packets sized, formatted and transmitted according to 802.11 protocol definitions and requirements. The circuitry is therefore operable to generate a plurality of first protocol packets in one embodiment of the invention that each contain a fragment number, a common second protocol packet ID and a second protocol channel ID. In the described embodiment, the common second protocol is Bluetooth. The first protocol is I.E.E.E. 802.11. In one particular embodiment, an 802.11(n) protocol communication is utilized wherein the second communication protocol data packet is transmitted over a plurality of signal streams.

More generally, however, the first protocol is one of an I.E.E.E. I.B.S.S. protocol communications and WiMedia. By using the peer-to-peer IBSS transmission modes of 802.11, along with the encapsulation techniques of the embodiments of the present invention, the apparatus is operable to encapsulate master-save communications according to the second communication protocol and to transmit the encapsulated communications through a peer-to-peer configuration using the first communication network protocol.

The fragment of the second protocol communication packet (Bluetooth in the described example) is encapsulated in a frame body portion of a data packet formed according to the first communication protocol. The first protocol may be any one of I.E.E.E. 802.11 or 802.16 or 802.20. Alternatively, the first protocol may be WiMedia.

More specifically, an 802.11 MAC data service unit (MDSU) typically includes a packet ID, a fragment number, a channel ID and a payload fragment in one embodiment of the invention. The larger PAN (e.g., Bluetooth) data packets are broken into fragments which are then loaded into the payload fragment portion of the MDSU data packet shown in FIG. 15. The fragment number is then used downstream to reconstruct the original larger data packet (for example, back into an L2CAP packet for Bluetooth. The MDSU further includes a source address, a destination address, routing information (often NULL in the described embodiment), data (the L2CAP fragment as described above), priority information and service class (ACK or no ACK).

Figure 17:
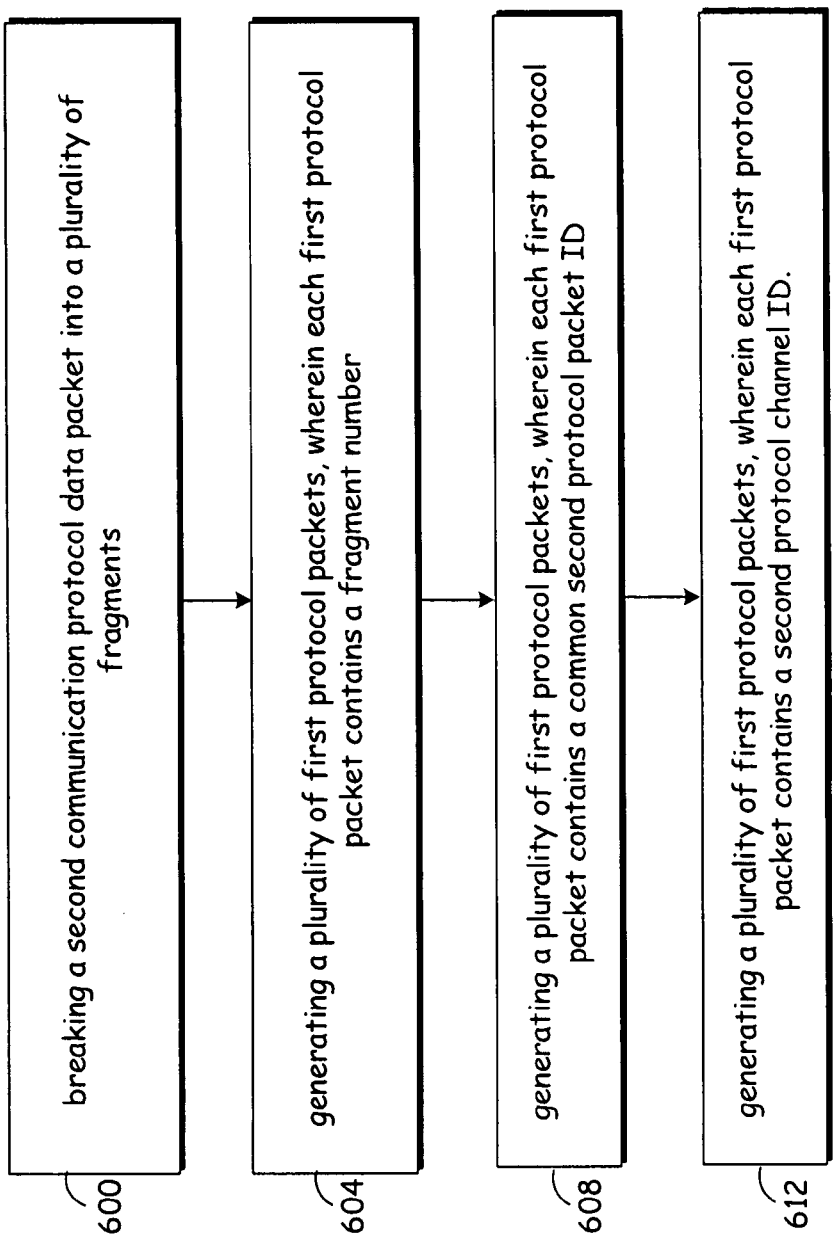
FIG. 17 is a network diagram illustrating operation and systems according to one embodiment of the invention.

FIG. 17 is a flow chart illustrating a method for communication over a first protocol communication link and for transmitting second protocol communications over the first protocol communication link according to one embodiment of the invention. The method comprises breaking a second communication protocol data packet into a plurality of fragments (step 600) and generating a plurality of first protocol packets, wherein each first protocol packet contains a fragment number (step 604), a common second protocol packet ID (step 608) and a second protocol channel ID (step 612) in addition to at least one of the plurality of fragments.

The method includes an embodiment wherein the first protocol is I.E.E.E. 802.11(n) protocol communications and wherein the second communication protocol data packet is transmitted over a plurality of communication channels according to the first communication protocol. More generally, though, the method includes, in one embodiment, utilizing a first protocol that is one of an I.E.E.E. protocol communications, including I.E.E.E. 802.11, I.E.E.E. 802.16, I.E.E.E. 802.20, WiMedia and a second protocol that is a personal area network protocol such as Bluetooth®.

Along these lines, the method includes encapsulating master-save communications according to the second communication protocol (e.g., Bluetooth) and transmitting the encapsulated communications through a peer-to-peer configuration using the first communication network protocol. Typically, the second communication protocol is broken into packet fragments which are encapsulated in a frame body portion of a data packet formed according to the first communication protocol.

Generally, an apparatus is provided for encapsulating and transmitting second protocol communications over a first protocol communication link. The apparatus includes circuitry operable to break a second communication protocol data packet into a plurality of fragments and to generate a plurality of first protocol packets containing a fragment number and a common second protocol packet ID and, in the first of the plurality of first protocol packets, a second protocol channel ID. The first protocol packets further including an indication of a length of the second protocol data packet, a first protocol packet ID and all fragments of the second protocol data packet within a frame body.

Figure 18:
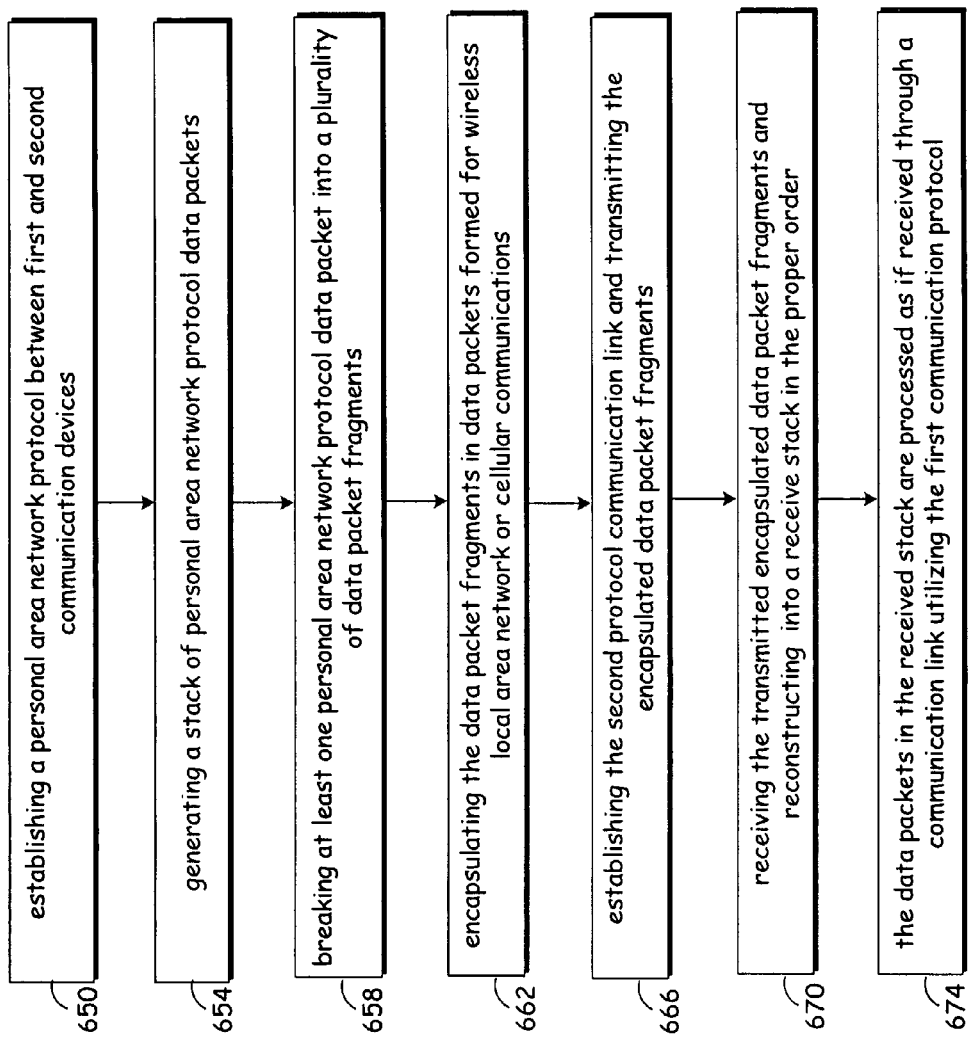
FIG. 18 is a timing diagram illustrating operation according to one embodiment of the invention.

FIG. 18 is a flow chart illustrating a method according to one embodiment of the invention. A first step comprises establishing a personal area network protocol between first and second communication devices (step 650). The method further includes generating a stack of personal area network protocol data packets (step 654). Thereafter, the method includes breaking at least one personal area network protocol data packet into a plurality of data packet fragments (step 658). The broken packet(s), namely the data packet fragments, are then encapsulated into data packets formed for wireless local area network or cellular communications for transmitting over the second network protocol between the first and second devices (step 662). Thus, the method includes establishing the second protocol communication link and transmitting the encapsulated data packet fragments over the second protocol communication link (step 666). One aspect of the embodiment of the invention is that that encapsulated fragments may not be received in a sequential order that allows for proper reconstruction of the original first protocol data packets. For example, in many transmission schemes such as TCP, corrupted and lost packets are re-transmitted. Accordingly, the order in which the packets are received are not necessarily the order in which they were transmitted. Accordingly, a packet fragment number is transmitted with every packet and is used to identify the relative arrangement of the packet fragments forming the first protocol data packet. The packet ID and/or the fragment number may also be used to identify the relative order of the packets.

The transmitted encapsulated data packet fragments are thus received and reconstructed into the original first communication protocol data packets and placed into a receive stack in the proper order (step 670). Thereafter, the data packets in the received stack are processed as if received through a communication link utilizing the first communication protocol (step 674).

Other aspects of the embodiment of the present invention are further illustrated in the attached presentation materials.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. An apparatus for encapsulating communications of one protocol and for transmitting encapsulated communications utilizing a different protocol in a peer-to-peer configuration, comprising:
    a circuitry operable to break a data packet of a second communication protocol into a plurality of fragments, in which the data packet provides a master-slave communication with a device within the peer-to-peer configuration; and
    a circuitry operable to encapsulate the fragments to generate a plurality of first protocol packets that contain the encapsulated fragments and to transmit the first protocol packets to the device using a first communication protocol, wherein each first protocol packet contains a fragment number, a common second protocol packet ID and a second protocol channel ID.

2. The apparatus of claim 1 wherein the first communication protocol is a 802.11(n) communication protocol and the first protocol packets are transmitted over a plurality of communication channels according to the 802.11(n) communication protocol.

3. The apparatus of claim 1 wherein each fragment is encapsulated in a frame body portion of a respective first protocol packet.

4. The apparatus of claim 1 wherein the second communication protocol is Bluetooth communication protocol.

5. The apparatus of claim 4 wherein the first protocol is one of 802.11, 802.16 or 802.20 communication protocol.

6. The apparatus of claim 4 wherein the first communication protocol is WiMedia.

7. A method for encapsulating communications of one protocol and for transmitting encapsulated communications utilizing a different protocol in a peer-to-peer configuration, comprising:
    breaking a data packet of a second communication protocol into a plurality of fragments, in which the data packet provides a master-slave communication with a device within the peer-to-peer configuration;
    encapsulating the fragments to generate a plurality of first protocol packets that contain the encapsulated fragments; and
    transmitting the first protocol packets to the device using a first communication protocol, wherein each first protocol packet contains a fragment number, a common second protocol packet ID and a second protocol channel ID.

8. The method of claim 7 wherein when transmitting the first protocol packets, the first communication protocol uses a 802.11(n) communication protocol and the first protocol packets are transmitted over a plurality of communication channels according to the 802.11(n) communication protocol.

9. The method of claim 7 wherein each fragment is encapsulated in a frame body portion of a respective first protocol packet.

10. The method of claim 7 wherein the second communication protocol is Bluetooth communication protocol.

11. The method of claim 10 wherein the first communication protocol is one of 802.11, 802.16 or 802.20 communication protocol.

12. The method of claim 10 wherein the first communication protocol is WiMedia.

* * * * *